United States Patent
De Graaff et al.

(10) Patent No.: US 8,364,378 B2
(45) Date of Patent: Jan. 29, 2013

(54) METHOD OF OPERATION OF AN ELECTRIC TURBOCOMPOUNDING SYSTEM

(75) Inventors: Tjerk Michiel De Graaff, Southampton (GB); Jonathon McGuire, Southampton (GB); Stephen Henry Hill, Wotton-Under-Edge (GB); John Anthony Lyons, Southampton (GB)

(73) Assignee: Bowman Power Group Limited, Hampshire (GB)

( * ) Notice: Subject to any disclaimer, the term of this patent is extended or adjusted under 35 U.S.C. 154(b) by 187 days.

(21) Appl. No.: 12/672,601

(22) PCT Filed: Aug. 8, 2008

(86) PCT No.: PCT/GB2008/002700
§ 371 (c)(1),
(2), (4) Date: Feb. 7, 2011

(87) PCT Pub. No.: WO2009/022109
PCT Pub. Date: Feb. 19, 2009

(65) Prior Publication Data
US 2011/0172894 A1    Jul. 14, 2011

(30) Foreign Application Priority Data
Aug. 10, 2007  (GB) .................. 0715661.5

(51) Int. Cl.
*F02B 37/12*  (2006.01)
*F02G 3/00*   (2006.01)
*F02D 29/06*  (2006.01)

(52) U.S. Cl. .................. 701/102; 290/52; 60/605.2

(58) Field of Classification Search .................. 701/102, 701/101, 115; 60/605.2, 608, 602; 123/568.21; 290/52, 7
See application file for complete search history.

(56) References Cited

U.S. PATENT DOCUMENTS

| | | | |
|---|---|---|---|
| 4,665,704 A | 5/1987 | Hartwig | |
| 6,604,360 B1 | 8/2003 | Vuk | |
| 6,681,575 B2 * | 1/2004 | Dellora et al. | 60/602 |
| 7,047,743 B1 | 5/2006 | Stahlhut et al. | |
| 7,336,000 B2 * | 2/2008 | Stahlhut et al. | 290/52 |
| 2006/0113799 A1 | 6/2006 | Obayashi et al. | |

FOREIGN PATENT DOCUMENTS

| | | |
|---|---|---|
| EP | 1833159 | 9/2007 |
| EP | 1848084 | 10/2007 |
| JP | 63253896 | 10/1988 |
| WO | 2004011790 | 2/2004 |

* cited by examiner

*Primary Examiner* — Hieu T Vo
(74) *Attorney, Agent, or Firm* — Price Heneveld LLP

(57) ABSTRACT

A method of operation of an electric turbocompounding system for a reciprocating engine comprises the steps of retrieving from the engine ECU data pertaining to engine condition, retrieving from a set of turbine efficiency data an optimum turbogenerator speed at the engine condition, setting a desired turbogenerator set speed based on the engine condition and on a speed at which turbine efficiency is deemed to be optimum, measuring an output voltage of the turbogenerator, comparing the measured voltage with a pre-determined voltage range and where the measured voltage falls outside of the pre-determined voltage range, adjusting the turbogenerator set speed to reduce or increase the output voltage to within the pre-determined voltage range.

17 Claims, 3 Drawing Sheets

METHOD OF OPERATION OF AN ELECTRIC TURBOCOMPOUNDING SYSTEM

The present invention relates to a method of operation of an electric turbocompounding system and to a computer readable medium including instructions for carrying out the same.

An electric turbocompounding system comprises a turbogenerator that is used to extract power from the exhaust of a traditional reciprocating engine. The thermal energy output through the exhaust is converted into mechanical power which in turn drives an electrical generator to produce electrical power. The electrical power can be used to power electrical loads or to directly drive the engine crank shaft, making significant increases in power and fuel economy.

Electric turbocompounding systems can operate under the demands of many conflicting requirements such as the need to maximize power and fuel economy whilst minimizing emissions. It is important that the system operates safely. Furthermore, it can be desirable to run the system so as to optimize the efficiency of the turbo machinery. In addition to this, use of the system in different vehicles or applications means that certain parameters become more important than others depending on the specific application. As a result, a voltage output of the turbogenerator can vary under the influence of the various parameters and if left unchecked may result in the unsafe operation and possible failure of the system and/or uneconomical performance of the system.

It is an aim of the present invention to manage the conflicting requirements and to control the operation of the electric turbocompounding system in a simple yet effective manner to obtain a safe and optimized performance from the system according to the specific requirements at the time. The invention is set out in the independent claims. Optional features are set out in the dependent claims thereto.

According to a first aspect of the invention, there is provided a method of operation of an electric turbocompounding system, the system comprising a turbocharger arranged in fluid communication with a reciprocating engine, and a turbogenerator arranged in fluid communication with a turbine of the turbocharger, the method comprising the steps of: retrieving from the engine ECU data pertaining to engine condition; retrieving from a set of turbine efficiency data an optimum turbogenerator speed at the engine condition; setting a desired turbogenerator speed based on the engine condition and on a speed at which turbine efficiency is deemed to be optimum; measuring an output voltage of the turbogenerator, comparing the measured voltage with a pre-determined voltage range and where the measured voltage falls outside of the pre-determined voltage range, adjusting the set turbogenerator speed to reduce or increase the output voltage to within the pre-determined voltage range.

In this manner, the system can be operated safely and yet optimally with respect to the current engine running conditions, maximizing the power output of the engine by adjusting a single parameter, the turbogenerator set speed, in response to the various demands of the system. The turbogenerator set speed is defined as a desired speed at which the turbogenerator should operate having regard to the current running conditions.

In an embodiment, the data pertaining to engine condition may include data relating to the torque, engine speed and to the mass flow through the engine.

The method may comprise the step of adjusting an actual turbogenerator speed in accordance with—i.e. to match as closely as possible—the set turbogenerator speed.

In an embodiment, the step of adjusting the actual turbogenerator speed is implemented by adjusting the load on a crank shaft of the turbogenerator. Increasing the torque on the crank shaft reduces the speed of the turbogenerator, whilst reducing the torque applied to the crank shaft results in an increase in the turbogenerator speed. In an embodiment, after a change in applied torque to the crank shaft, a turbogenerator response is monitored, for example its acceleration and actual speed. Where the turbogenerator actual speed differs from the set speed, the load on the crank shaft may be accordingly re-adjusted until the actual speed and set speed are more evenly matched.

The method may comprise the further step of, prior to adjusting the turbogenerator set speed to reduce/increase the output voltage to within the pre-determined voltage range, checking that the proposed turbogenerator set speed is not a critical speed of a rotor of the turbogenerator. This step ensures that the turbogenerator is not operated at a speed that could compromise the mechanical integrity of the rotor. At this stage, if it is found that the turbogenerator set speed is a critical speed of the rotor, the set speed can be adjusted away from the critical speed.

The method may comprise the further step of, following the step of setting turbogenerator speed based on engine condition, checking for a sudden increase in torque demand on the engine, and in the event that a sudden increase in torque demand is detected, reducing the turbogenerator set speed. This has the advantage of increasing the pressure ratio across the turbine stages. Reducing turbogenerator speed reduces the effect of pressure ratio across the turbogenerator turbine, thereby increasing the pressure ratio across the turbine of the turbo charger.

The system may comprise an exhaust gas recirculation conduit disposed between an air intake conduit and an exhaust of the reciprocating engine. The method may comprise the further step of, following the step of setting turbogenerator set speed based on engine condition, checking for an additional exhaust gas recirculation requirement and in the event that insufficient mass flow through the exhaust gas recirculation conduit is detected, increasing the turbogenerator set speed. This increases the pressure ahead of the turbogenerator turbine, which increases the pressure in the exhaust system to drive more exhaust gas through the exhaust gas recirculation conduit.

Alternatively, following the step of setting turbogenerator speed based on engine condition, the method may comprise a further step of checking for an additional exhaust gas recirculation requirement and in the event that excess mass flow through the exhaust gas recirculation is detected, reducing the set turbogenerator speed. This has the effect of reducing the expansion ratio across the turbine, reducing pressure in the exhaust system.

The predetermined voltage range may be determined by the maximum power limit of an alternator of the turbogenerator and by the maximum operating current of the turbogenerator. In this manner, the electric turbocompounding system is operated within safe electrical limits.

According to a second aspect of the invention, a computer readable medium (e.g. a carrier disk or carrier signal) is provided, having computer-executable instructions which, when run on a computer (e.g. a controller or ECU) causes the implementation of the method according to the first aspect of the invention.

The computer-readable medium may be located in the reciprocating engine ECU and/or it may be located in a turbogenerator controller such as a motor drive controller of the turbogenerator crankshaft.

An embodiment of an electric turbocompounding system according to the invention will now be described by way of example, with reference to the accompanying drawings, in which.

Figure 1:
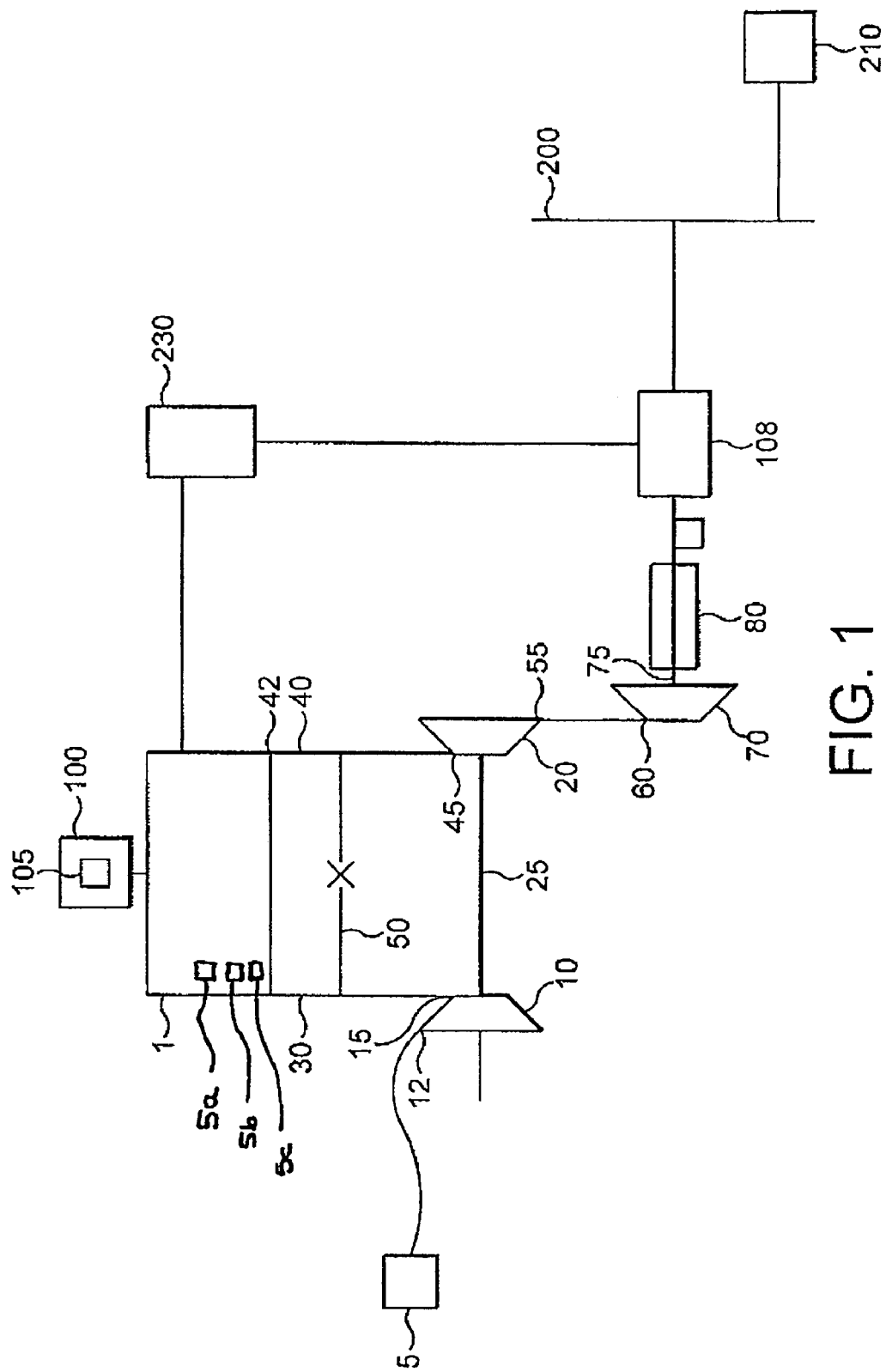
FIG. 1 is a schematic layout of an electric turbocompounding system in accordance with the present invention.

A typical layout of an electric turbocompounding system is shown in FIG. 1. The system comprises a turbocharger having a compressor 10 and a turbine 20 each mounted on a common rotor 25. The compressor 10 comprises an inlet 12 at a low pressure side thereof, the inlet 12 being connected to an air supply 5. An outlet 15 at the high pressure side thereof of the compressor 10 is in fluid communication with an air intake 30 of a reciprocating engine 1. The reciprocating engine 1 may be a petrol or diesel fuelled engine, with at least one cylinder in communication with the air intake 30 and an exhaust gas outlet 42 of an exhaust conduit 40. The reciprocating engine 1 includes an ECU (engine control unit) 100.

The exhaust conduit 40 of the reciprocating engine 1 is in fluid communication with an inlet 45 of the turbine 20. Between the air intake 30 and the exhaust conduit 40 is an exhaust gas recirculation conduit 50 in fluid communication with each of the air intake 30 and the exhaust conduit 40. An outlet 55 of the turbine 20 of the turbocharger is in fluid communication with an inlet 60 of a second turbine 70 of a turbogenerator. The turbogenerator comprises the second turbine 70 and an alternator generator 80. The alternator generator 80 is mounted on the shaft 75 of the turbine 70 to provide a means of generating electrical power from the energy output of the turbine shaft 75. Electricity generated by the turbogenerator is managed by a motor generator drive controller 108 which controls the turbogenerator speed by adjusting the load to the motor generator 230 and controls power to a DC bus 200 from where it can be distributed to other ancillary electrical loads 210. The ancillary loads could for example be air conditioning, fans or coolant pumps.

Figure 2:
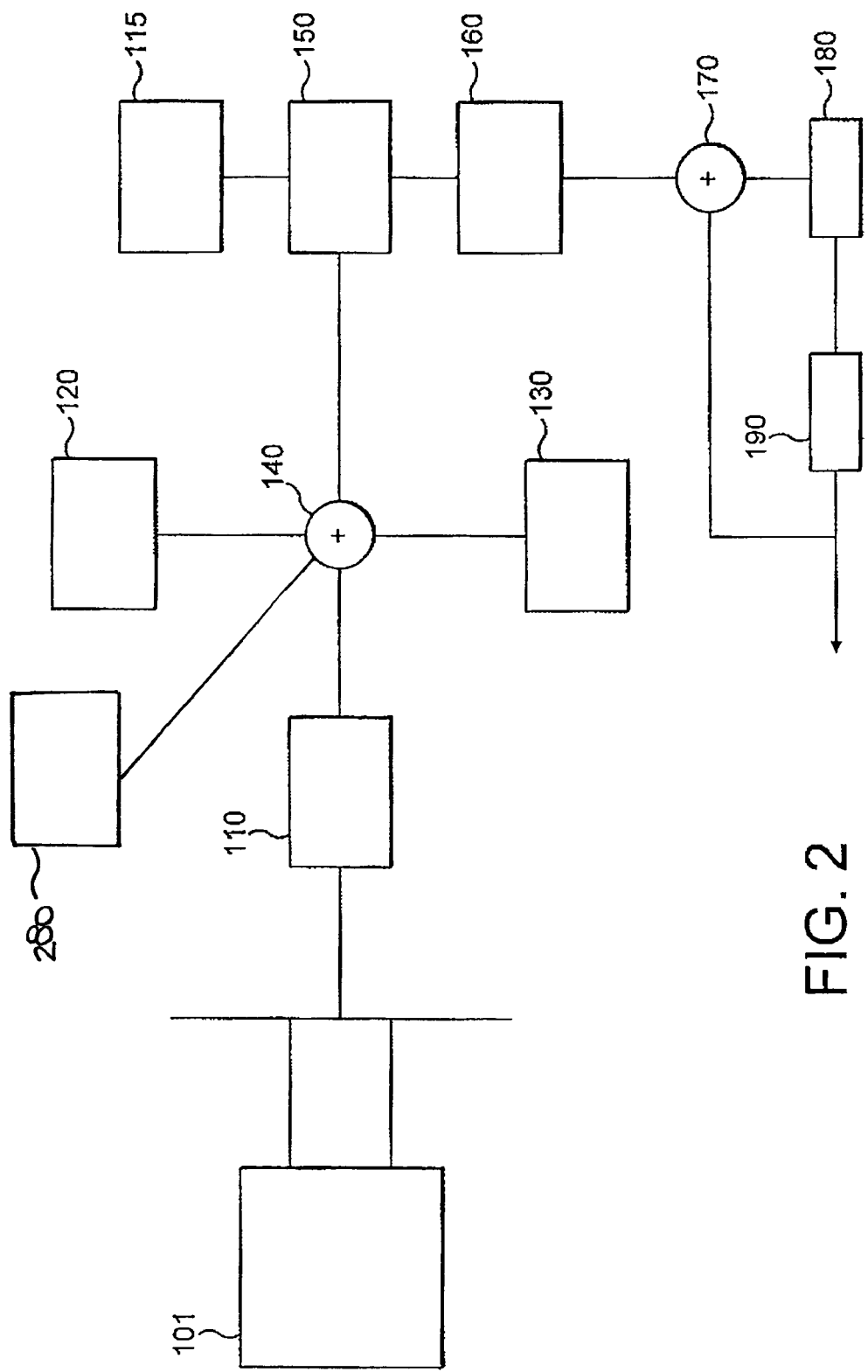
FIG. 2 is a flow diagram showing the method steps in accordance with the present invention.

A flow chart describing the operation of the electric turbocompounding system is shown in FIG. 2. The operation comprises steps instructed by the computer-readable medium 105 to the controller 108 in order to determine a desired turbogenerator speed, known as the set speed. The turbogenerator speed is, in normal operation, controlled according to the loading on the alternator 80. The control is exercised by the motor generator drive controller 108 of the turbogenerator. The motor generator drive controller 108 communicates electronically with the engine ECU and is aware of the turbogenerator speed. If the turbogenerator accelerates above its set speed, more torque is applied to the crank shaft and the additional load on the turbogenerator holds the speed steady. Similarly, if the turbogenerator starts decelerating below its set speed, the torque applied to the crank shaft is reduced. Depending on the specific requirements of the turbocompounding system, several factors may be considered when selecting the turbogenerator set speed. These features include the current engine running conditions, containing the rectified DC link voltage output of the turbogenerator within pre-agreed limits, optimizing the turbomachinery efficiency, optimizing the system efficiency, the need to reduce turbo lag at the turbocharger, control of exhaust gas recirculation and critical speed avoidance. The proposed method of the invention takes one or more of these features into account depending on the specific engine requirements.

In an embodiment of the invention, the method uses three sets of input data to determine the turbogenerator set speed. The three sets of data pertain to the engine condition (step 101), to the turbine efficiency (step 110) and to a measured voltage output of the turbogenerator (step 115). At step 101 of FIG. 2, the engine ECU supplies to the computer-readable medium data pertaining to engine condition during running of the engine, such data including the torque demand on the engine, the engine speed, mass flow of air through the engine and whether any additional exhaust gas recirculation requirement is necessary. This may be the case where either an excess or a deficiency of air is detected in the exhaust gas recirculation conduit 50 at any particular time during running of the engine. The data supplied from the ECU is retrieved by the computer-readable medium 105 that is provided in the ECU. Alternatively, the computer-readable medium 105 is provided in a motor generator drive controller 108 of the turbogenerator crankshaft. The computer-readable medium 105 calculates from the data an optimum turbogenerator speed at which the turbogenerator should operate in order to provide optimum engine performance (step 140). The desired turbogenerator speed is known as the turbogenerator set speed.

Figure 3:
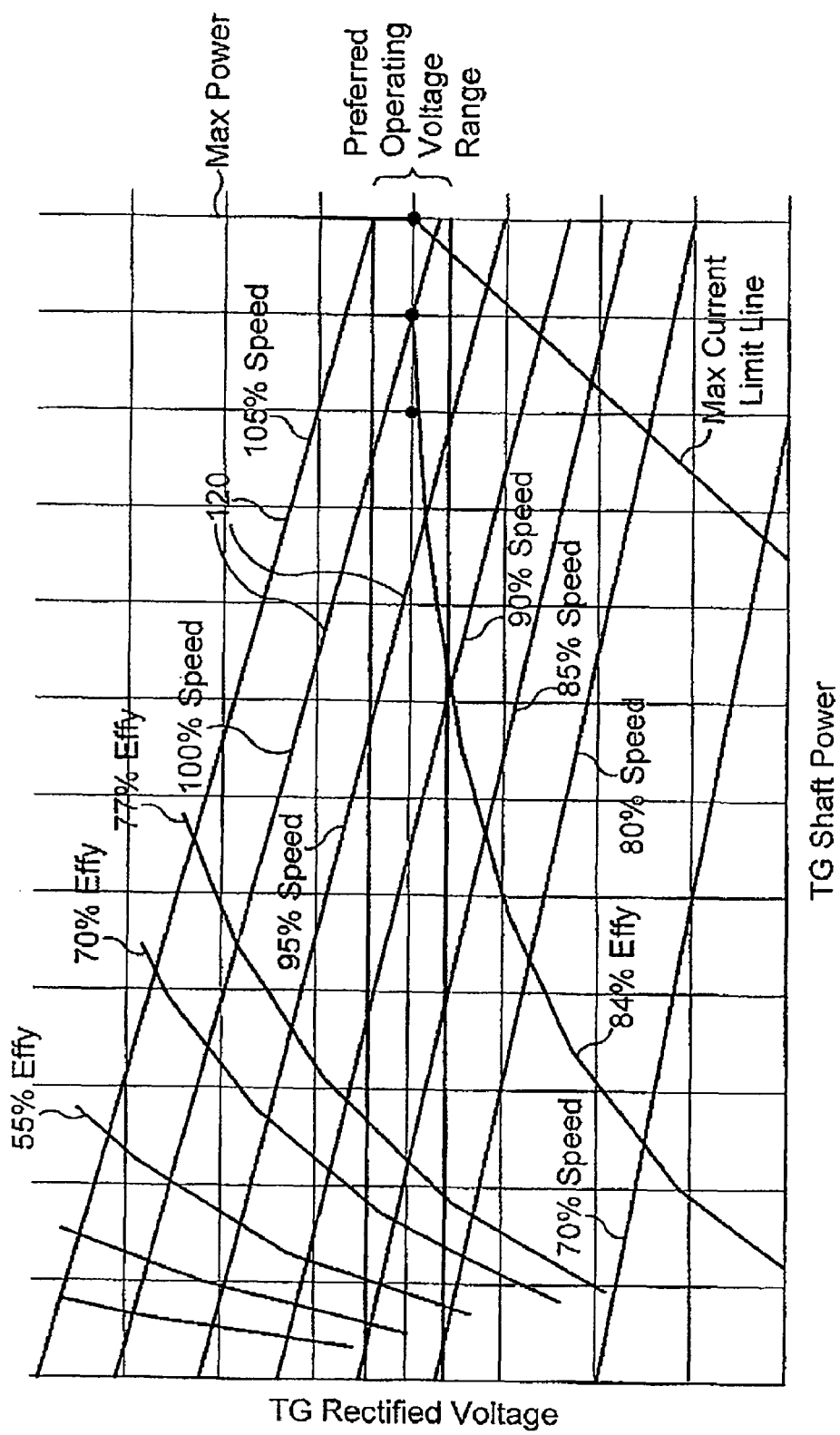
FIG. 3 is an example of a map of turbogenerator efficiency with respect to turbogenerator speed, power and output voltage.

An output voltage of the turbogenerator is measured at step 115 and is input into a map of a "safe-envelope" at step 150, the safe-envelope designed to maintain the voltage within certain boundaries. An example of a pre-agreed range of output voltage is shown on such a map in FIG. 3.

The rectified DC link voltage output may be affected by the following factors: turbogenerator load (the voltage drops as the load increases), the operating temperature of the turbogenerator magnets (the voltage drops as temperature increases), manufacturing tolerances of the turbogenerator and turbogenerator speed (voltage increases as speed increases). As the first three of these factors varies, the controller 108 will adjust the turbogenerator set speed to compensate and hold the voltage within the agreed range.

At step 150, the computer-readable medium 105 checks that the turbogenerator set speed falls within the "safe-envelope" of speeds for the particular alternator and turbomachinery being used. The map shown in FIG. 3 indicates how the rectified DC link voltage output of the turbomachinery varies with power and turbogenerator speed for a specific turbogenerator design. The curves show possible typical voltages for a machine running at normal operating temperatures. The voltage is likely to be dependent on factors such as machine tolerance and also on the temperature of the turbogenerator magnets. The map shows the preferred operating voltage range and the maximum power and maximum current limit lines determined by the electrical properties of the alternator 80. It may be seen that the operational "safe-envelope" lies within the boundaries set by the maximum power, maximum current and the agreed voltage range. The agreed voltage range will depend on the equipment used and will vary from application to application. The map includes indications of turbogenerator speed at 120 which can be used where the turbogenerator set speed falls within the "safe-envelope". If it is determined upon a comparison with the "safe-envelope" that the turbogenerator set speed calculated at step 140 falls within the envelope, then there is no need to adjust the set speed at step 150. However, should the turbogenerator set speed fall outside of the "safe-envelope", then the turbogenerator set speed must be adjusted enough that it falls within the "safe-envelope" at step 150.

The maximum power limit is determined by the alternator 80 design and also upon operating conditions including coolant supplied etc. If the engine conditions are such that the turbomachinery produces power above the maximum power, the turbogenerator might eventually heat up and trigger an engine de-rate signal to the ECU. The maximum current is set to prevent excessive heating of the electrical connections and cables. Magnet temperature affects the voltage output during start up of the turbogenerator when it is likely that the magnets will not have reached their normal operating temperature and the voltage output will be higher than expected. The computer-readable medium 105 can be configured to take the magnet temperature into account and can compensate the turbogenerator speed as the turbogenerator is warming up, to maintain the voltage within the "safe-envelope". The controller can also be configured to adjust the turbogenerator set speed to compensate for normal manufacturing tolerances in magnet strength, size and location. Keeping the output voltage within the limits of the "safe-envelope" is the most important factor in determining the turbogenerator set speed. However, whilst keeping the output voltage within the limits of the "safe-envelope", a range of speeds is available. Additional factors can be taken into account to further optimize the turbogenerator set speed for different running conditions.

An important factor for maximizing the system power output is to establish the turbogenerator speed that will produce optimum turbogenerator efficiency. The controller 108 in this embodiment maintains the voltage within the safe envelope whilst setting the turbogenerator set speed to achieve optimum turbine efficiency of the turbogenerator. The data required to set the speed can be passive, i.e. from a pre-defined look-up table as explained in further detail below, or it may be determined actively by measuring turbine entry conditions and calculating the optimum efficiency speed at step 110. The computer-readable medium 105 utilizes the engine condition data from the ECU 100 pertaining to torque, speed and mass flow and inputs it into a data map of turbogenerator efficiency. From FIG. 3, it can be seen that the optimum turbine efficiency is achievable by reducing the speed of the turbogenerator when the turbine power is reducing. The optimum efficiency line can be followed until the minimum voltage has been reached at which the voltage line is reached with reduced turbine power.

The look-up table of turbine efficiency data is, in an embodiment, based on performance test data of the system and may, for example, contain data pertaining to turbine efficiency at different values of engine torque and engine speed. The look-up table may also be in the form of a contour map. Whichever format is used, the turbine efficiency data is stored in the turbogenerator controller 108.

A further important factor that can be taken into consideration is to adjust the turbogenerator set speed to optimize the efficiency of the electric turbcompounding system. The system efficiency can be measured 'actively' whilst the system is in use. In an embodiment, data pertaining to the fuel economy of the engine is retrieved from the ECU 100. The fuel economy is measured in grams per kilowatt hours (g/kWh). In an alternative embodiment, the fuel economy is determined using a sensor 5a that is located on the reciprocating engine 1 as shown only schematically in FIG. 1. Sensor 5a is located in the fuel line to the fuel injectors (not shown) and is arranged to measure the engine fuel usage in grams per second (g/s). This data is combined with engine condition data from the ECU pertaining to engine torque and speed to produce an indicator of the fuel economy of the system, measured in grams per kilowatt hours (g/kWh). In either embodiment, the fuel economy should be maximized (i.e. the value in g/kWh should be minimized) to obtain the highest possible system efficiency. A subroutine of the computer program monitors the fuel economy indicator at step 280 as seen in FIG. 2 and communicates the value to the controller. The controller 108 adjusts the turbogenerator speed in order to try to minimize the value of the indicator. If the ECU is not configured to provide the data pertaining to engine torque and speed, then further sensors 5b and 5c can be provided on the reciprocating engine to measure these values. Sensor 5b is arranged on the engine crankshaft and is arranged to measure engine torque. Sensor 5c is also arranged on the crankshaft and is arranged to measure the crankshaft speed.

A further factor that may be taken into account whilst setting the turbogenerator set speed is shown schematically in FIG. 2 at step 120. At this stage of the method, the computer-readable medium checks for a high torque with respect to time, in other words for a sudden acceleration of the engine. Should a sudden acceleration be detected, the turbogenerator set speed can be reduced to reduce turbo lag. Turbo lag describes the behavior of turbochargers fitted to a reciprocating engine. As the systems are coupled together by a fluid (air and exhaust gas) there is a delay in response of the turbocharger compared to the engine. When the engine is accelerated fast or there is a sudden increase in load, there is a delay before the turbochargers have accelerated to and settled at the new conditions. To reduce the time taken for the turbochargers to settle at new engine conditions, the power into the turbine 20 of the turbocharger can be increased by decreasing the pressure ratio across the turbogenerator turbine 70 by reducing the speed of the turbogenerator. Reducing the speed of the turbogenerator reduces the effective pressure ratio across the turbine 70 of the turbogenerator, increasing the pressure ratio across the turbine 20.

A further factor that may be taken into account when setting the turbogenerator set speed is that of controlling the exhaust gas recirculation through the exhaust gas recirculation conduit 50. At step 130, the computer-readable medium 105 checks as to whether an additional EGR requirement has been detected. For example, the EGR level may need to be increased or it may need to be decreased according to the level of exhaust flow through the conduit 50. In the event that an additional EGR requirement is detected, the turbogenerator set speed may be increased or decreased. If the turbogenerator set speed is increased, the effective expansion ratio is increased and the pressure upstream of the turbine 20 is increased. This effect can be used to increase the pressure further up the exhaust system 40 to drive more of the exhaust through the EGR conduit 50. Conversely, when the EGR level needs to be decreased, the computer-readable medium can cause the controller 108 to slow down the turbogenerator set speed and hence reduce the pressure upstream of the turbine 20, hence reducing the pressure in the exhaust 40. This will result in a reduced EGR flow.

At step 140 in the flowchart of FIG. 2, each of the desired additional factors is taken into account to calculate the nominal turbogenerator set speed. The nominal turbogenerator set speed calculated at step 140 is a simple aggregate of each of the inputs from the steps 110, 120 and 130. This nominal set speed is then checked against the "safe-envelope" as discussed above and adjusted as necessary at step 150.

Having determined that the desired turbogenerator set speed falls within the "safe-envelope", a further optional check may be made by the computer-readable medium to determine whether the set speed is sufficiently close to a critical speed of the turbogenerator rotor such that to operate the turbomachinery at this speed might compromise the wear life of the turbomachinery. Thus at step 160, the computer-readable medium retrieves from a look-up table a set of speed ranges that need to be avoided. Depending on whether the turbogenerator speed is to be accelerated or decelerated, the turbogenerator set speed can be stepped up in speed or stepped down in speed respectively to avoid the critical speeds of the rotor.

Once all relevant checks have been made, it can be determined as to whether the actual turbogenerator speed needs to be increased or decreased in order to correspond with the desired turbogenerator set speed. This step is undertaken at step 170 shown in FIG. 2. Should the actual turbogenerator speed need increasing, the torque applied to the crank shaft is reduced. Similarly, if the actual turbogenerator speed needs to be reduced in order to meet the desired turbogenerator set speed, the load on the crank shaft is increased. At step 190, the computer-readable medium monitors a response from the turbogenerator once the load adjustment has been applied. The response may compromise the rate of acceleration or deceleration or the actual speed of the turbogenerator. If a difference is measured between the actual turbogenerator speed and the desired turbogenerator set speed, then a feedback loop becomes operational to keep adjusting the load on the turbogenerator crank shaft at step 180. However, in the event that the actual turbogenerator speed corresponds with the desired turbogenerator set speed, then the turbogenerator speed is maintained until engine conditions change such that an adjusted turbogenerator speed becomes necessary. The computer-readable medium 105 constantly monitors the engine conditions for signs that the turbogenerator set speed may need readjusting.

It will be apparent to the skilled person that various modifications can be made to the apparatus and method disclosed herein without departing from the scope of the accompanying claims.

The invention claimed is:

1. A method of operation of an electric turbocompounding system, the system comprising a turbocharger arranged in fluid communication with a reciprocating engine and a turbogenerator arranged in fluid communication with a turbine of the turbocharger, the method comprising the steps of:
   retrieving from the engine ECU data pertaining to engine condition;
   retrieving from a set of turbine efficiency data an optimum turbogenerator speed at the engine condition;
   setting a desired turbogenerator set speed based on the engine condition and on a speed at which turbine efficiency is deemed to be optimum;
   measuring an output voltage of the turbogenerator, comparing the output voltage with a pre-determined voltage range and where the output voltage falls outside of the pre-determined voltage range, adjusting the turbogenerator set speed to reduce or increase the output voltage to within the pre-determined voltage range.

2. A method as claimed in claim 1, further comprising adjusting an actual turbogenerator speed in accordance with the turbogenerator set speed.

3. A method as claimed in claim 2, wherein adjusting the actual turbogenerator speed comprises adjusting a load on the turbogenerator.

4. A method as claimed in claim 3, further comprising monitoring a response of the turbogenerator to the load adjustment, comparing actual turbogenerator speed with the turbogenerator set speed and where the actual turbogenerator speed differs from the turbogenerator set speed, re-adjusting the load on the turbogenerator.

5. A method as claimed in claim 1 in which the set of turbine efficiency data is predetermined performance test data.

6. A method as claimed in claim 1, further comprising the step of, prior to adjusting the turbogenerator set speed to reduce or increase the output voltage to within the pre-determined voltage range, retrieving from the ECU data pertaining to critical speeds of a rotor of the turbogenerator and checking that the turbogenerator set speed is not a critical speed of the rotor of the turbogenerator.

7. A method as claimed in claim 1, further comprising following setting turbogenerator set speed based on engine condition, checking for a sudden increase in torque demand on the engine, and in the event that a sudden increase in torque demand is detected, reducing the turbogenerator set speed.

8. A method as claimed in claim 1, wherein the system comprises an exhaust gas recirculation conduit disposed between an air intake and an exhaust conduit of the reciprocating engine, the method further comprising the step of, following the step of setting the desired turbogenerator set speed based on engine condition, checking for an additional exhaust gas recirculation requirement and in the event that insufficient mass flow through the exhaust gas recirculation conduit is detected, increasing the turbogenerator set speed.

9. A method as claimed in claim 1, wherein the system comprises an exhaust gas recirculation conduit disposed between an air intake conduit and an exhaust of the reciprocating engine, the method further comprising the step of, following the step of setting turbogenerator set speed based on engine condition, checking for an additional exhaust gas recirculation requirement and in the event that excess mass flow through the exhaust gas recirculation conduit is detected, reducing the set turbogenerator speed.

10. A method as claimed in claim 1, in which the pre-determined voltage range is determined by factors including a maximum power limit of the turbogenerator alternator and by a maximum operating current of the turbogenerator.

11. A method as claimed in claim 1, further comprising the step of retrieving from the engine ECU data pertaining to a fuel economy of the engine and adjusting the turbogenerator set speed to maximise the fuel economy of the engine and thereby increase efficiency of the electric turbocompounding system.

12. A method as claimed in claim 1, in which engine condition comprises one or more of torque, engine speed and mass flow rate through the reciprocating engine.

13. A computer-readable medium having instructions which, when run on a computer, cause implementation of the method of claim 1.

14. A computer-readable medium as claimed in claim 13 and being located in the engine ECU.

15. A computer-readable medium as claimed in claim 13 and being located in a turbogenerator controller.

16. A computer-readable medium as claimed in claim 13 in which a portion of the instructions is located in the engine ECU and a portion of the instructions is located in a turbogenerator controller.

17. An electric turbocompounding system comprising a turbocharger arranged in fluid communication with a reciprocating engine, a turbogenerator arranged in fluid communication with a turbine of the turbocharger, and a computer-readable medium as in claim 13.

* * * * *